United States Patent [19]

Hattori et al.

[11] Patent Number: 5,671,511
[45] Date of Patent: Sep. 30, 1997

[54] INTERENGAGING FASTENER MEMBER HAVING FABRIC LAYER

[75] Inventors: Jiro Hattori, Atsugi; Shinji Torigoe, Sagamihara; Norihito Shibahara, Hachioji; Osamu Sawajiri, Sagamihara, all of Japan

[73] Assignee: Minnesota Mining and Manufacturing Company, St. Paul, Minn.

[21] Appl. No.: 295,616

[22] Filed: Aug. 25, 1994

[30] Foreign Application Priority Data

Aug. 25, 1993 [JP] Japan .................. 5-210660

[51] Int. Cl.$^6$ .......................... A44B 18/00; A44B 17/00
[52] U.S. Cl. .................. 24/444; 428/100; 24/442
[58] Field of Search .................. 428/100; 24/444, 24/493, 450, 446, 447, 575–577, 306, 452

[56] References Cited

U.S. PATENT DOCUMENTS

| | | | |
|---|---|---|---|
| 3,031,730 | 5/1962 | Morin | 24/204 |
| 3,192,589 | 7/1965 | Pearson | 24/452 |
| 3,196,511 | 7/1965 | Kintner | 24/450 |
| 3,266,113 | 8/1966 | Flanagan, Jr. | 24/204 |
| 3,320,649 | 5/1967 | Naimer | 28/72 |
| 3,403,429 | 10/1968 | Smith | 24/204 |
| 3,408,705 | 11/1968 | Kayser et al. | 24/204 |
| 3,469,289 | 9/1969 | Whitacre | 24/450 |
| 3,537,946 | 11/1970 | Truax et al. | 161/66 |
| 3,694,867 | 10/1972 | Stumpf | 24/448 |
| 3,773,580 | 11/1973 | Provost | 156/66 |
| 3,849,840 | 11/1974 | Yamada et al. | 24/204 |
| 3,899,803 | 8/1975 | Brumlik | 24/204 |
| 3,899,805 | 8/1975 | McMillan . | |
| 4,147,580 | 4/1979 | Buell | 156/291 |
| 4,169,303 | 10/1979 | Lemelson | 24/204 |
| 4,216,257 | 8/1980 | Schams et al. | 24/448 X |
| 4,290,174 | 9/1981 | Kalleberg | 24/204 |
| 4,290,832 | 9/1981 | Kalleberg | 156/72 |
| 4,322,875 | 4/1982 | Brown et al. | 24/447 |
| 4,454,183 | 6/1984 | Wollman | 428/92 |
| 4,563,380 | 1/1986 | Black et al. | 428/100 |
| 4,615,084 | 10/1986 | Erb | 24/442 |

(List continued on next page.)

FOREIGN PATENT DOCUMENTS

| | | | |
|---|---|---|---|
| 0 258 015 | 3/1988 | European Pat. Off. | A44B 18/00 |
| 2 264 209 | 3/1974 | France | F16B 5/07 |
| 1-238 805 | 9/1989 | Japan | A44B 18/00 |
| 2-134012 | 11/1990 | Japan | A44B 18/00 |
| 4-123106 | 4/1991 | Japan | A44B 18/00 |
| 4-338402 | 5/1991 | Japan | A44B 18/00 |
| 1 350 009 | 4/1974 | United Kingdom | A44B 13/00 |
| WO89/08201 | 9/1989 | WIPO | F16B 5/07 |
| WO92/19119 | 11/1992 | WIPO | A44B 18/00 |

OTHER PUBLICATIONS

Brochure entitled "Scotchmate™ Dual Lock Fastening Systems" 3M Company (Feb. 1987).

*Primary Examiner*—Peter M. Cuomo
*Assistant Examiner*—Robert J. Sandy
*Attorney, Agent, or Firm*—Gary L. Griswold; Walter N. Kirn; Leland D. Schultz

[57] ABSTRACT

An interengaging fastener member having a base with a flexibility for conforming to the curved objective surface, without damaging a function for supporting headed stems. A fastener member 10 is provided with a base 12 and a plurality of headed stems 14 arranged on the base 12. The headed stem 14 has a stem 16 projecting substantially upright from the base 12, and a head 18 connected to the end of the stem 16. The base 12 includes a plate layer 26 having a first major surface 20, and a fabric layer 30 bonded to a surface opposite to the first major surface 20. The plate layer 26 is connected to proximal ends 22 of the stems 16 of the headed stems 14 by integral molding process. The plate layer 26 and the fabric layer 30 are bonded together in an injection molding process for the plate layer 26. Because the fabric layer 30 assists a function of the base 26 for supporting headed stems, it is possible to provide the base 12 with a flexibility for conforming to a curved objective surface, by making the plate layer 26 relatively thin.

5 Claims, 3 Drawing Sheets

U.S. PATENT DOCUMENTS

| | | | |
|---|---|---|---|
| 4,706,914 | 11/1987 | Ground | 248/74.3 |
| 4,710,190 | 12/1987 | Wood et al. | 604/389 |
| 4,710,414 | 12/1987 | Northrup et al. | 428/43 |
| 4,769,895 | 9/1988 | Parkins | 29/450 |
| 4,776,068 | 10/1988 | Smirlock et al. | 24/442 |
| 4,784,890 | 11/1988 | Black | 428/100 |
| 4,819,309 | 4/1989 | Behymer | 24/576 |
| 4,842,916 | 6/1989 | Ogawa et al. | 24/444 X |
| 4,894,060 | 1/1990 | Nestegard | 604/391 |
| 4,933,224 | 6/1990 | Hatch | 428/100 |
| 4,984,339 | 1/1991 | Provost et al. | 24/452 |
| 4,994,054 | 2/1991 | Pigneul et al. | 24/306 X |
| 5,040,275 | 8/1991 | Eckhardt et al. | 24/442 X |
| 5,058,245 | 10/1991 | Saito | 24/306 |
| 5,077,870 | 1/1992 | Melbye et al. | 24/452 |
| 5,100,400 | 3/1992 | Mody et al. | 604/391 |
| 5,110,649 | 5/1992 | Morse et al. | 24/444 X |
| 5,140,727 | 8/1992 | Dais et al. | 24/587 |
| 5,149,573 | 9/1992 | Kobe et al. | 428/93 |
| 5,196,266 | 3/1993 | Lu et al. | 24/575 X |
| 5,201,101 | 4/1993 | Rouser et al. | 24/575 |
| 5,212,853 | 5/1993 | Kaneko | 24/452 |
| 5,235,731 | 8/1993 | Anzai et al. | 24/576 |
| 5,242,646 | 9/1993 | Torigoe et al. | 264/219 |
| 5,369,852 | 12/1994 | Higashinaka | 24/446 |
| 5,384,939 | 1/1995 | Weber | 24/306 |

INTERENGAGING FASTENER MEMBER HAVING FABRIC LAYER

TECHNICAL FIELD

The present invention relates to an interengaging fastener member having a fabric layer.

BACKGROUND OF THE INVENTION

Various interengaging fasteners of the type having a plurality of headed stems on a major surface of a base thereof have been known in the art. For example, one type of fastener includes a fastener member that has a base comprising interwoven warp and weft yarns, with a plurality of headed stems of resinous monofilament woven into the base and projecting generally orthogonally therefrom. Fastener members of this type may be engaged with a fastener member having a plurality of projecting loops, as shown in, for example, U.S. Pat. No. 5,100,400 (Mody et al.). Another conventional type of interengaging fastener member includes an integrally molded base and a plurality of headed stems projecting orthogonally from the base. This type of fastener member may be interengaged with an opposed, like fastener member to form a fastener for releasably securing together two objects. An example of this type of fastener is shown in, for example, U.S. Pat. No. 5,242,646 (Torigoe et al.).

An example of a conventional fastener including a combination of the similar fastener members is illustrated in FIG. 5. Each of a pair of interengaging fastener members 1 is provided with a base 2, and a plurality of headed stems 3 are arranged on the base 2 in a predetermined spaced relationship. Each headed stem 3 has a stem 4 projecting generally orthogonally from the base 2, and a head 5 connected to the distal end of the stem 4. To interengage the fastener members 1 with each other, the respective bases 2 are arranged substantially parallel to each other with the heads 5 thereof being mutually opposed and in contact with each other, as shown in FIG. 5(a). When a predetermined compressive engagement force is applied to the bases 2, the heads 5 of one fastener member 1 slide against, at the apex 6 thereof, the heads 5 of the other fastener member 1. The stems 4 of both fastener members resiliently deflect, and thus the respective heads enter into the space between adjacent stems 4 of the opposed fastener member 1, as shown in FIG. 5(b). Thus, the headed stems 3 of one fastener member 1 are engaged at their bottom surfaces 7 with the bottom surfaces 7 of the other fastener member 1. In this manner, a pair of interengaging fastener members 1 may be interengaged with each other. The mutually engaged fastener members 1 can be disengaged by applying a predetermined tensile disengagement force to the bases 2.

Because of the force that is applied to the headed stems when the interengaging fastener member is either engaged with or disengaged from the other fastener member, it is necessary for the base to have thickness and rigidity sufficient for firmly supporting the headed stems against that force. However, in conventional fastener members having headed stems woven into the base, the headed stems may be pulled out from the base during disengagement because the base cannot adequately distribute the stress applied to the headed stems. Accordingly, unitary molded fastener members are often used for applications in which high disengagement forces are expected.

In general, an interengaging fastener member is mounted on the surface of an object at the base of the fastener member, through fastening means such as an adhesive, a double-sided pressure sensitive adhesive tape, a bolt, or a clip. However, if the surface of the object is not planar, the base of a unitary molded fastener member may not be able to conform to the surface of the object, and therefore the fastener member either will not be secured to the surface, or will be secured inadequately. For example, if the surface of the object is wavy, a gap may be created between the surface and the base of a unitary molded fastener member, which is undesirable. Furthermore, when a thin, soft article such as a floor carpet must be fixed on a rigid, non-planar surface by an integrally molded fastener member, the appearance of the article may suffer if an observer can see or feel the fastener member through the article. Also, a fastener member having an integrally molded resinous base and headed stems may be unable to accommodate deformation of the surface of the object (due to temperature changes, for example), and may become detached from the surface of the object.

In an effort to provide a fastener member that does not suffer from these drawbacks, it may be possible to reduce a thickness of the base. However, reduced base thickness in turn reduces the disengagement force of the fastener member, because the headed stems typically cannot all be held in the desired upright position. Also, a fastener with reduced base thickness typically is less durable because the junction area between the base and the headed stem is susceptible to unacceptably high stress concentration, which can lead to deterioration of the fastener member.

In view of the foregoing disadvantages of the fastener members of the prior art, it is desirable to provide an interengaging fastener member having headed stems and a flexible base capable of conforming and adhering to a non-planar or a thermally deformed surface of an object.

SUMMARY OF THE INVENTION

The present invention provides an interengaging fastener member comprising a base having a major surface, and a plurality of headed stems arranged on and projecting generally orthogonally from the base in a predetermined spaced relationship. Each of the headed stems includes a stem connected at a proximal end thereof to the major surface of the base, and a head connected to a distal end of the stem. The base comprises a resin plate layer having the major surface, and a fabric layer bonded to the surface of the resin plate layer opposite the major surface.

In this interengaging fastener member, the resin plate layer is preferably bonded to the fabric layer by the infiltration of a resin component of the resin plate layer into a fibrous structure of the fabric layer in a boundary surface between both layers. The fabric layer may be formed of a non-woven fabric. Preferably, the base has an elastic modulus of between $10^3$ kgf/cm$^2$ and $5 \times 10^4$ kgf/cm$^2$. The base and the stems and heads of the headed stems may be integrally molded by an injection molding process using a destructible stem mold.

The present invention also provides a method for producing an interengaging fastener member comprising a base and a plurality of headed stems arranged on the base in a predetermined spaced relationship, each of the headed stems having a stem connected at a proximal end thereof to the base, and a head connected to a distal end of the stem. The method comprises the steps of providing a permanent base mold having a cavity for molding the base, a destructible stem mold having a plurality of cavities for molding the stems of the headed stems, and a permanent head mold having a plurality of cavities for molding the heads of the headed stems; placing a fabric in the cavity for forming the base of the base mold; securing the destructible stem mold adjacent the permanent base mold with the cavities for molding the stems in fluidic communication with the cavity for molding the base, and securing the permanent head mold adjacent to the destructible stem mold with the cavities for molding the heads in fluidic communication with the cavities for molding the stems; flowing a molten polymeric material into the head mold, the stem mold and the base mold, through an inlet passageway provided to one of the head mold, the stem mold and the base mold, whereby the polymeric material is brought into contact with the fabric spread out in the cavity for molding the base of the base mold; integrally molding the interengaging fastener member from the polymeric material and the fabric, inside the head mold, the stem mold and the base mold; separating the base mold and the head mold from the destructible stem mold and molded the interengaging fastener member; and destructively removing the stem mold from the molded interengaging fastener member. In the above method, the step of destructibly removing the stem mold may include a step of dissolving the destructible stem mold by a solvent, which may be, for example, water.

According to another aspect of the present invention, an interengaging fastener member is provided, comprising a base and a plurality of headed stems arranged on the base in a predetermined spaced relationship, each of the headed stems having a stem connected at a proximal end thereof to the base, and head connected to a distal end of the stem. The fastener member is produced by the steps of providing a permanent base mold having a cavity for molding the base, a destructible stem mold having a plurality of cavities for molding the stems of the headed stems, and a permanent head mold having a plurality of cavities for molding the heads of the headed stems; spreading out a fabric in the cavity of the base mold; securing the destructible stem mold adjacent the permanent base mold with the cavities for molding the stems in fluidic communication with the cavity for molding the base, and securing the permanent head mold adjacent to the destructible stem mold with the cavities for molding the heads in fluidic communication with the cavities for molding the stems; flowing a molten polymeric material into the head mold, the stem mold and the base mold, through an inlet passageway provided to one of the head mold, the stem mold and the base mold, whereby the polymeric material is brought into contact with the fabric spread out in the cavity for molding the base of the base mold; integrally molding the interengaging fastener member from the polymeric material and the fabric, inside the head mold, the stem mold and the base mold; separating the base mold and the head mold from the destructible stem mold and molded the interengaging fastener member; and destructively removing the stem mold from the molded interengaging fastener member.

BRIEF DESCRIPTION OF THE DRAWINGS

The present invention will be further explained with reference to the appended Figures, wherein like structure is referred to by like numerals throughout the several views, and wherein:

FIG. 5 is an illustration of a conventional fastener having a pair of interengaging fastener members, wherein

DETAILED DESCRIPTION OF THE INVENTION

Figure 1:
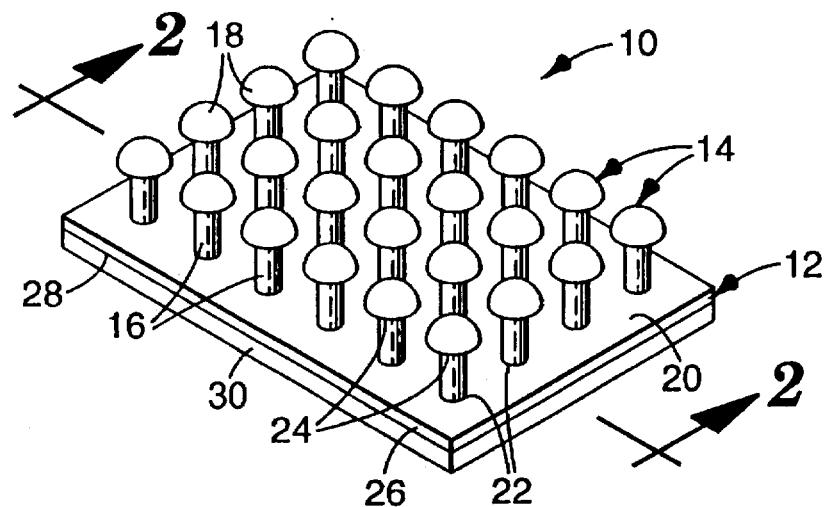
FIG. 1 is a perspective view of an interengaging fastener member according to one embodiment of the present invention.
Figure 2:
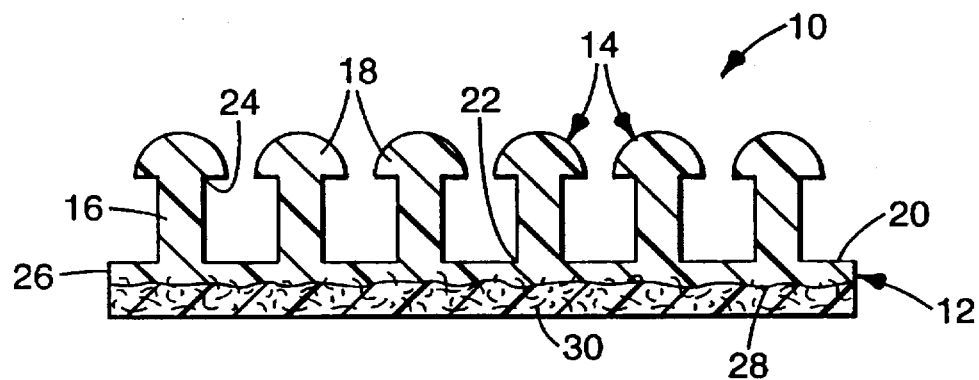
FIG. 2 is a cross-section of the interengaging fastener member of FIG. 1 taken along line II—II.

Referring to the drawings, FIGS. 1 and 2 show an interengaging fastener member 10 according to one embodiment of the present invention. The fastener member 10 includes a generally flat base 12, and a plurality of headed stems 14 adjoining and projecting generally orthogonally from the base 12 in a predetermined spaced relationship. Each headed stem 14 has a stem 16, and a head 18 formed at the end of the stem 16. The head has a diameter at at least one location that is greater than the diameter of the stem. The stem 16 has a proximal end 22 that adjoins first major surface 20 of the base 12, and a distal end 24 connected to the head 18.

The base 12 is formed as a laminated product from a plate layer 26 having a first major surface 20 and a fabric layer 30 adjoining a second major surface 28 opposite the first major surface 20. Preferably, the plate layer 26 adjoins the distal ends 22 of the stems 16 of the headed stems 14 by an integral-molding process, as shown in FIG. 2. The plate layer 26 and the fabric layer 30 may be adjoined by various means, such as an adhesive, or a conventional welding process. To bond the plate layer and the fabric layer easily, the fabric layer 30 may be placed as an insert within a mold in the integral-molding process. A resinous material may then be introduced into the mold, and become interspersed with the fibrous structure of the fabric layer 30, whereby the plate layer 26 and the fabric layer 30 may be bonded together.

The plate layer 26 of the base 12 is made of polymeric material, such as polyamide resin, polyester resin, polypropylene resin, polyethylene resin, or polyacetal resin. Polyamide resin is believed to be a particularly suitable material because of its thermal durability, its mechanical strength, and its ease of use in injection molding processes. The fabric layer 30 is made of various fabrics, such as knitted fabric, woven fabric or non-woven fabric including natural or synthetic fibers. In a preferred embodiment, the fabric layer 30 is made of non-woven fabric of synthetic fibers, such as polyester fibers.

The base 12 (comprising both the plate layer and the fabric layer) preferably has an elastic modulus of between $10^3$ kgf/cm$^2$ and $5 \times 10^4$ kgf/cm$^2$, to permit the base to be sufficiently flexible to conform to a curved or irregular surface while maintaining a plurality of headed stems 14 in a predetermined upright position. Depending on the area of the plate layer, the plate layer 26 preferably has a thickness of between 0.1 mm and 0.5 mm, and the base 12 preferably has a total thickness of between 0.5 mm and 2.5 mm. The elastic modulus of the base 12 may be changed by adding plasticizer or a reinforcing member to the polymeric material of the plate layer 26. Although not illustrated, a metallic layer may be laminated onto the surface of the fabric layer 30 of the base 12 opposite the plate layer 26, to electrically ground the fastener member 10 to the object on which the fastener member is fixed. A metallic layer may also enhance the adhesion of an adhesive or double-coated adhesive tape used for affixing the fastener member to the object.

The fastener member construction described herein allows the fastener member to conform to a curved, irregular, or sharp-edged surface, while keeping the headed stems 14 in desired upright position. Thus, the fastener member 10 having such structure can be firmly affixed to the surface of many different objects. When this fastener is used for attaching a thin, soft article, such as a floor carpet, to a rigid surface, the potentially unfavorable appearance caused at the position corresponding to the base 12, or uncomfortable hard feeling of the carpet due to the base 12 concealed beneath the carpet can be avoided due to the elasticity of the fabric layer 30 of the base 12. Furthermore, when the object on which the fastener member 10 is fixed is thermally deformed, the fabric layer 30 of the base 12 also can deform in the shear direction while conforming to the deformation of the object surface. Thus, the base 12 tends not to peel away from the object surface when the base 12 is fixed on the objective surface by, for example, a double-coated adhesive tape.

Figure 3:
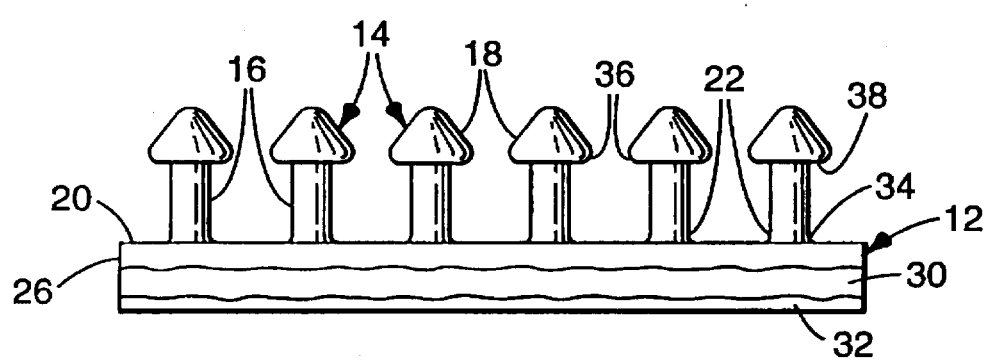
FIG. 3 is a side view of another embodiment of an interengaging fastener member according to the present invention.

The interengaging fastener member according to the present invention may have any dimensions and shapes. In the above embodiment, the base 12 may be formed with dimensions and shapes, such as a rectangular or circular plate, which enable the base to fixedly, hold the headed stems 14. Also, the plate layer 26 of the base 12 may be provided with a mechanical fastening means, such as a clip or threaded post, for affixing the fastener member to the objective surface. Alternatively, as shown in FIG. 3, the fastener member may be affixed to the object surface by means of a pressure-sensitive adhesive layer 32 that is coated on the fabric layer 30 of the base 12.

In other embodiments of the fastener member of the present invention, more than two stems 16 of the headed stem 14 may be provided for each head 18. Also the stem 16 may have various shapes, such as a cylindrical, prismatic, or frustoconical shape. Further, as shown in FIG. 3, a radiused corner 34 having a predetermined radius of curvature may be provided in the junction area between the proximal end 22 of the stem 16 and the first major surface 20 of the base 12, for attenuating the stress concentration in the junction area when the headed stem 14 is deflected. As shown in the drawings, the head 18 may have various sizes and shapes, such as a hemispherical, spherical, conical, or an umbrella shape. For example, in the headed stem 14 having a cylindrical stem 16 and a hemispherical head 18, the diameter of the stem 16 is preferably between 20% and 70% of the diameter of the head 18, to provide a sufficient disengagement force. Also, as shown in FIG. 3, the peripheral edge 36 of the head 18 is preferably formed without sharp edges, for reducing scratch noises generated when the head 18 is engaged with the head of the opposed headed stem. Further, the head 18 may have recesses or grooves for reducing an engagement force required for interengagement.

The fastener member according to the present invention may be made of various materials. In the above embodiments, similar to the plate layer 26 of the base 12, the headed stem 14 may be formed of a polymeric material, such as polyamide resin, polyester resin, polypropylene resin, polyethylene resin, or polyacetal resin. The plate layer 26 of the base 12 may be made of the same or a different material than that of the headed stem 14. The headed stem 14 is preferably made of material having a bending modulus of elasticity of between $10^3$ kgf/cm$^2$ and $10^5$ kgf/cm$^2$ according to a measurement based on ASTM testing method D790. Also, the stem 16 of the headed stem 14 may be made of a high strength material different from the material of the head 18, for improved durability.

The interengaging fastener member according to the present invention may be formed by various methods. It is advantageous to integrally mold the base and the headed stems by an injection molding process using a destructible stem mold, to easily form the headed stem having unique shapes. This method is the subject of U.S. Pat. No. 5,242,646 (Torigoe et al.), the contents of which is incorporated by reference herein, and which will be described briefly below with reference to FIG. 4.

Figure 4A:
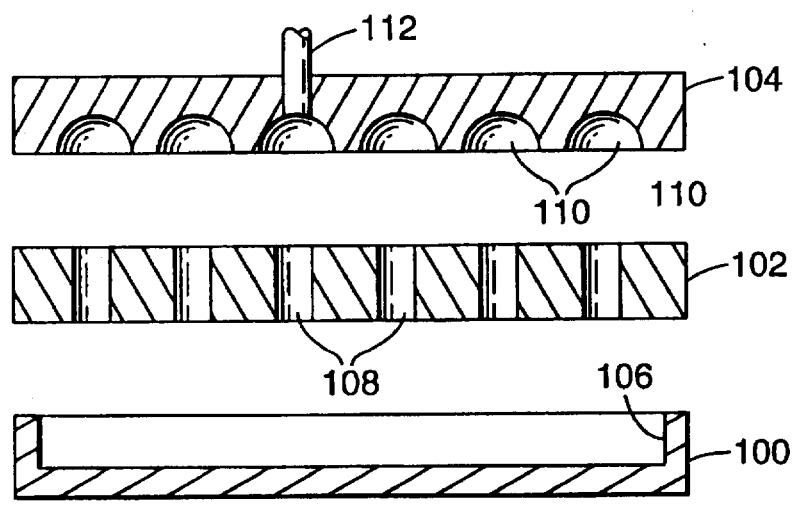
FIG. 4 is a cross-sectional view illustrating steps for producing an interengaging fastener member according to the present invention.

As shown in FIG. 4(a), a base mold 100 for molding the base 12 of the interengaging fastener member 10, a stem mold 102 for molding the stems 16 of the headed stems 14, and a head mold 104 for molding the heads 18 of headed stems 14 are provided. The base mold 100 is a permanent mold that can be released from the molded interengaging fastener member 10 without destruction thereof, and has a cavity 106 corresponding to the base 12. The stem mold 102 is a destructible mold which may be destructively removed from the molded interengaging fastener member 10 in a manner as described below, and includes a plurality of cavities 108 corresponding to the stems 16 of an interengaging fastener member. The head mold 104 is a permanent mold that can be released from the molded interengaging fastener member 10 without destruction thereof, and has a plurality of cavities 110 corresponding to the heads 18. The cavities 106, 108 and 110 may have various contours corresponding to the desired shapes of the base 12, stems 16, and heads 18, as described above. Particularly, the stem mold 102 may have other shapes than illustrated one, so as to provide a desired flat or recessed portion on locking surface 38 (see FIG. 3) of the head 18, which confronts the base 1, or so as to form the grooves in the head 18.

The stem mold 102 is sufficiently durable to use as a core in the injection molding process for forming the interengaging fastener member 10, but which can be destructibly removed from the molded fastener member 10 by various means after the fastener member 10 has been molded. For example, the stem mold 102 may be removed from the periphery of the stems 16 by various mechanical or chemical methods, such as dissolving with a solvent (water or alcohol, for example), melting, disintegrating, shattering (by ultrasonic energy, for example), or cutting, without damaging the interengaging fastener member 10. In a preferred embodiment, the stem mold 10 is made of a water-soluble material. In this case, the stem mold 102 can be removed from the fastener member 10 by immersing the mold in cold or hot water and vibrating the mold. The water-soluble materials suitably used for the present invention are disclosed, for example, in European Patent Application No. 314,156 and U.S. Pat. Nos., 4,990,146 and 4,870,148, the contents of which are incorporated herein by reference. In this regard, the stem mold 102 may be formed from a suitable material in a desired shape by conventional injection molding processes.

Figure 4B:
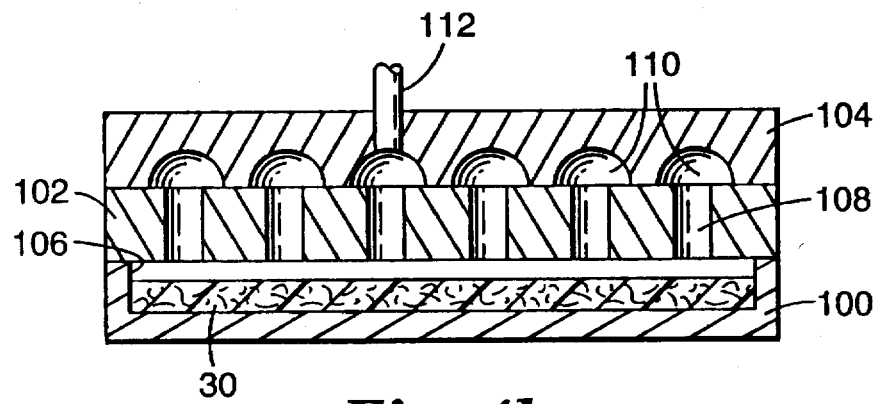

As shown in FIG. 4(b), the fabric layer 30 may be spread out in the cavity 106 of the base mold 100 while covering the bottom surface thereof. Then, the stem mold 102 is positioned between the base mold 100 and the head mold 104. The cavity 106 of the base mold 100, the cavities 108 of the stem mold 102, and the cavities 110 of the head mold 104 are connected with each other so that a fluid can flow therethrough and solidify to form the fastener member. A molten polymeric material is flowed into the cavities 110 through an inlet passageway 112 provided in the head mold 104. The inlet passageway for feeding the molten material may also or instead be provided in the base mold 100 or stem mold 102 so as to communicate with the cavity 106 or cavities 108, respectively.

The molten material flowed into the cavities 110 of the head mold 104 fills the cavity 106 to form the plate layer 26 of the base 12, fills the cavities 108 of the stem mold 102 to form the stems 16, and fills the cavities 110 of the head mold 104 to form the heads 18. The molten polymeric material thus becomes interspersed within the fibrous structure of the fabric layer 30 spread out in the cavity 106 of the base mold 100. Thereafter, as the molten polymeric material is solidified, the interengaging fastener member 10 is integrally molded, and includes laminated base 12 formed from the plate layer 26 adjoining the headed stems 14, with the fabric layer 30 bonded to the second major surface 28 of the plate layer 26 opposite to the first major surface 20.

Figure 4C:
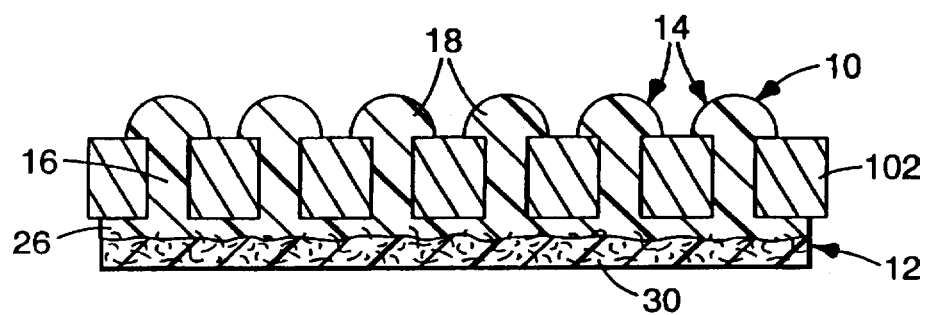
Figure 5A:
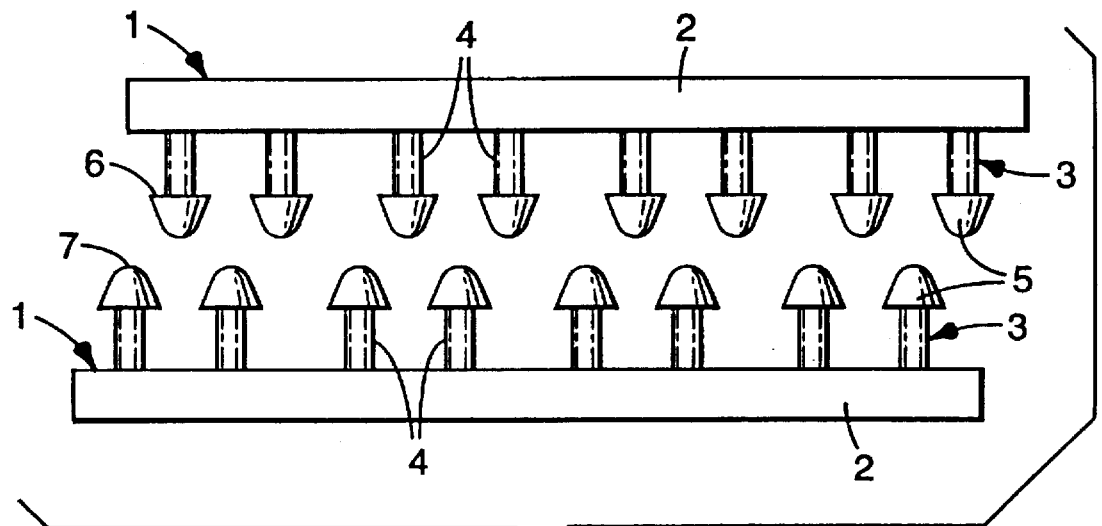
FIG. 5(a) is a side view before being engaged.
Figure 5B:
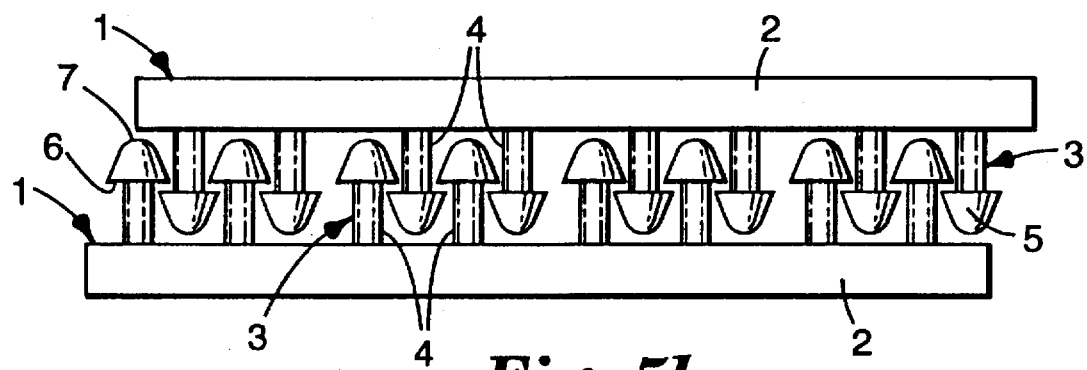
FIG. 5(b) is a side view after being engaged.

Once the interengaging fastener member 10 has been molded, the base and head molds 100 and 104 are removed from the molded fastener member 10, as shown in FIG. 4(c). Then, the stem mold 102 is destructively removed from the stems 16 of the headed stems 14 by various means described above. Thus, the interengaging fastener member 10 shown in FIGS. 1 and 2 is completed.

An exemplary fastener member was made in accordance with the present invention, as follows. The plate layer and headed stems were made with a polypropylene resin, and the fabric layer was a polyester non-woven fabric adjoining the plate layer. The fastener member was injection molded as a unitary member by an injection molding process using a destructible stem mold. The base measured 3 cm by 5 cm by 0.2 cm thick, the cylindrical stems measured 0.2 cm long by 0.06 cm in diameter, and the hemispherical head had a diameter of 0.12 cm. The elastic modulus of the base was $10^4$ kgf/cm$^2$.

The fastener member described above demonstrated excellent flexibility, in that the base of the fastener member was bent to 180° under a predetermined load and then allowed to return to its equilibrium shape. The base was not damaged and completely restored to the initial state, thus the flexibility for conforming to the objective surface having a curved or irregular surface is deemed to be excellent.

As apparent from the above description, according to the present invention, in an interengaging fastener member with headed stems, a base is formed as a laminated product from a plate layer and a fabric layer, so that the fabric layer assists the function of the plate layer for supporting the headed stems. Therefore, by making the plate layer as thin as possible, it is possible to provide the base with a flexibility for conforming to the objective surface including a curved, irregular, or sharp-edged portion, without damaging the supporting function for the headed stems. Further, the fabric layer disposed between the objective surface and the plate layer of the base can be easily deformed in the shearing direction generally parallel to the objective surface, therefore the plate layer is not influenced by the thermal deformation of the objective surface, and a risk for peeling off is eliminated in a high temperature environment. Thus, the interengaging fastener member according to the present invention can be securely fixed on various objective surface, and maintained in a fixed state even in a high temperature environment, whereby it is widely applied to various field of utilization.

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. An interengaging fastener member comprising a base layer of a molded polymeric material and a fabric layer, said plate layer having first and second major surfaces, and a plurality of headed stems adjoining and projecting generally orthogonally from the first major surface in a predetermined spaced relationship, each of the headed stems including a stem connected at a proximal end thereof to the first major surface and a head connected to a distal end of the stem, wherein said fabric layer is bonded to said second major surface by a resin interspersed within a fibrous structure of said fabric layer.

2. An interengaging fastener member as set forth in claim 1, wherein the fastener member comprises means for attenuating stress concentration in the junction areas between the headed stems and the first major surface.

3. An interengaging fastener member as set forth in claim 1, wherein said fabric layer is formed of a non-woven fabric.

4. An interengaging fastener member as set forth in claim 1, wherein said base has an elastic modulus of between $10^3$ kgf/cm$^2$ and $5\times10^4$ kgf/cm$^2$.

5. An interengaging fastener member as set forth in claim 1, wherein said base and said stems and heads of said headed stems are integrally molded by an injection molding process using a destructible stem mold.

* * * * *